Patented Aug. 28, 1951

2,566,194

UNITED STATES PATENT OFFICE 2,566,194

POLYPHOSPHONIC ESTERS

Hugh J. Hagemeyer, Jr., and Alan Bell, Kingsport, Tenn., assignors to Eastman Kodak Company, Rochester, N. Y., a corporation of New Jersey No Drawing. Application February 16, 1948,
Serial No. 8,747

10 Claims. (Cl. 260—461)

This invention relates to polyphosphonic esters and to the preparation of those esters by reacting phosphonates with inorganic halides. The invention also relates to the use of these polyphosphonic esters as insecticides and rodenticides.

Phosphonic esters have previously been prepared as shown, for instance, in U. S. Patents 2,397,422, and 2,400,577, and in Beilstein, vol. IV, pages 595 and 596. Ordinarily phosphonates are prepared by reacting triethyl phosphite or some similar ester with an organic halide, such as methyl iodide or propyl bromide. Nowhere in the prior art, however, have the polyphosphonates been prepared nor has there been any recognition that the phosphonates by conversion to the polyphosphonates are useful for insecticidal purposes.

One object of our invention is to provide compounds having insecticidal properties. Another object of our invention is to provide a process by which polyphosphonic esters are produced. A further object of our invention is to provide new phosphorus-containing chemical compounds. Other objects of our invention will appear herein.

We have found that when phosphonates are reacted with inorganic halides that a joining of the phosphorus atoms occurs and polyphosphonic esters are obtained. We have found that by this method materials are prepared which are effective as insecticides, used either in the form of dusts or as sprays.

As pointed out above, alkyl and aryl phosphonates are ordinarily prepared by reacting an inorganic halide with a trialkyl phosphite ester, such as triethyl phosphite with the halide. The reaction which takes place may be represented as follows:

$(C_2H_5O)_3P + RX \longrightarrow (C_2H_5O)_3P(R)X$

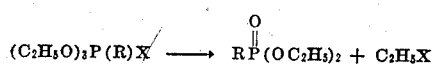

where R is alkyl, aryl, or arylalkyl and X is chlorine, bromine, or iodine. We have found that the polyphosphonic esters may then be prepared from the resulting products by subjecting the mixture of the phosphonic ester and an inorganic halide to an elevated temperature, such as within the range of 90–150° C. The reaction of sulfuryl chloride, thionyl chloride, and phosphorus oxychloride with diethyl ethyl phosphonate is as follows:

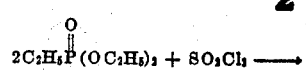

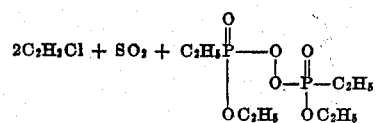

with thionyl chloride:

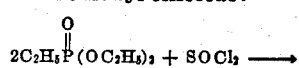

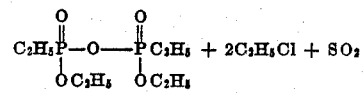

with phosphorus oxychloride:

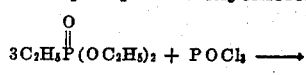

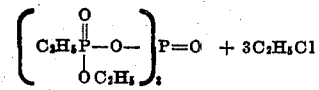

The reaction is carried out by adding the inorganic halide gradually to the required amount of the phosphonic ester at the indicated temperature. Instead, the phosphonic ester and the inorganic halide may first be mixed together and then heated to the reaction temperature. The completeness of the reaction is conveniently measured by the amount of the organic halide which is evolved. For instance, in the reaction shown, ethyl chloride is one of the reaction products. Instead of ethyl, other alkyl groups may be present in the phosphonates which are employed as the starting material in accordance with our invention. For instance, a phenyl phosphonate, a propyl phosphonate, or a benzyl phosphonate might be employed as the starting material. Also, other alkyl groups than ethyl may be present in the phosphonates. Some of the phosphonates employed as the starting material may be dipropyl ethyl phosphonate, dimethyl ethyl phosphonate, dimethyl phenyl phosphonate, dimethyl benzyl phosphonate, dibutyl ethyl phosphonate, or the like. Other inorganic halides may be employed, such as phosphorus thiochloride, sulfur monochloride, phosphorus trichloride, and phosphorus pentachloride. However, the chlorides whose reactions with the phosphonates are illustrated are preferred.

The temperature employed ordinarily will be within the range of 90–150° C., and we have found that the reaction proceeds nearly quantitatively. As the temperature used becomes lower, the speed of the reaction is lessened. For practical purposes temperatures below 90° C. are ordinarily not particularly useful because of the slowness with which the reaction proceeds. Also, temperatures above 150° C. promote the reaction at such a rapid rate that control is difficult and the operation proceeds too rapidly for use in commercial operations and, also, with temperatures above 150° C. the formation of by-products is obtained which limits the amount of yield which is obtained. Although ordinarily the process is carried out in batchwise fashion, it is within the scope of our invention to carry out the reactions by a continuous method if that is thought to be desirable.

The following examples illustrate our invention:

*Example 1.*—154 parts of phosphorus oxychloride were gradually added with stirring to 500 parts of diethyl ethyl phosphonate while heating at 110–130° C. The theoretical amount of ethyl chloride was obtained in about two hours. The final product was a tri(P-ethoxy-P-ethyl phosphonyl) phosphate. It was found to be a clear, faintly yellow liquid having a specific gravity of 1.286 and an index of refraction of 1.45 at 20° C.

*Example 2.*—332 parts of diethyl ethyl phosphonate were reacted with 118 parts of thionyl chloride, the reaction having been carried out in the same manner as described in the preceding example. A polyphosphonic ester was obtained having a specific gravity of 1.27 and an index of refraction of 1.4424 at 20° C. which ester exhibited good insecticidal properties.

Example 3.—332 parts of diethyl ethyl phosphonate were mixed gradually with 135 parts of sulfuryl chloride as described in Example 1. The resulting product was found to have useful insecticidal properties.

*Example 4.*—500 parts of diethyl ethyl phosphonate were reacted with 170 parts of phosphorus thiochloride, the reaction having been conducted as described in Example 1. A product having good insecticidal properties was obtained.

*Example 5.*—A phosphonate was prepared by reacting 16.6 parts of triethyl phosphite with 12.4 parts of α,β-dichloropropionitrile, the mass being cooled to maintain at 25–30° C., followed by subjecting to a temperature of 110–120° C. for ½ hour. Ethyl chloride is evolved and the product is

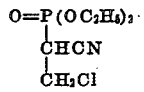

The product was contacted with activated charcoal to remove discolorations. 15.5 parts of this phosphonate were gradually mixed with 4.1 parts of thionyl chloride and the mixture was maintained at a temperature of 100–110° C. for ½ hour during which time ethyl chloride and sulfur dioxide were evolved. There was obtained 15 parts of a product having the following formula:

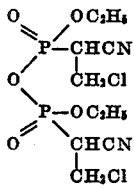

The product was contacted with charcoal for a time thereby removing discolorations and impurities. This product by hydrolyzing with water and treating with a tertiary amine such as pyridine, quinoline, dialkyl aniline or the like gives a product having the formula:

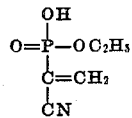

If the original phosphonate were treated directly with the tertiary amine, a product having the formula:

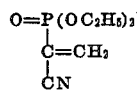

is obtained.

*Example 6.*—168 parts of PCl₃ were added gradually with stirring to 650 parts of diethyl phenyl phosphonate while heating at 120–140° C. A rapid evolution of ethyl chloride took place and the reaction was complete in 1½ hours. The final product was a dark yellow liquid which exhibited good insecticidal properties.

*Example 7.*—214 parts of diethyl phenyl phosphonate were mixed with 59 parts of thionyl chloride at 110–130° C. The product obtained, diethyl diphenyl pyrophosphonate, exhibited good insecticidal properties.

All of the materials described herein show good insecticidal properties when used in the form of dusts, such as an inert powder, such as finely divided sulfur containing 0.5–10% of the polyphosphonic ester. The material is also useful for spray purposes by mixing up in aqueous liquids, such as whale soap solution so as to contain 0.01–0.5% of the polyphosphonic ester. In general, it is preferred to use a phosphonic ester which will give a water-soluble product in the concentrations desired for use as sprays. In that case, which is true of most of the polyphosphonate esters, sprays may be formed merely by dissolving the polyphosphonate ester in water. If, however, other insecticides are to be incorporated, the use of a wetting agent of some sort may also be desirable.

We claim:

1. A method of preparing polyphosphonic esters which comprises heating an ester having the formula:

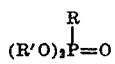

in which R' is an alkyl of 1 to 4 carbon atoms and R is a substituent selected from the group consisting of alkyls of 1 to 4 carbon atoms, phenyl and benzyl, with an inorganic halide selected from the group consisting of the halides and oxyhalides of sulfur and phosphorus.

2. A method of preparing polyphosphonic esters which comprises heating an ester having the formula:

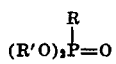

in which R' is an alkyl of 1 to 4 carbon atoms and R is a substituent selected from the group consisting of alkyls of 1 to 4 carbon atoms, phenyl and benzyl with thionyl chloride.

3. A method of preparing polyphosphonic esters which comprises heating an ester having the formula:

$$(R'O)_2\overset{R}{\underset{}{P}}=O$$

in which R' is an alkyl of 1 to 4 carbon atoms and R is a substituent selected from the group consisting of alkyls of 1 to 4 carbon atoms, phenyl and benzyl with sulfuryl chloride.

4. A method of preparing polyphosphonic esters which comprises heating an ester having the formula:

$$(R'O)_2\overset{R}{\underset{}{P}}=O$$

in which R' is an alkyl of 1 to 4 carbon atoms and R is a substituent selected from the group consisting of alkyls of 1 to 4 carbon atoms, phenyl and benzyl with phosphorus oxychloride.

5. A method of preparing polyphosphonic esters which comprises heating an ester having the formula:

$$(R'O)_2\overset{R}{\underset{}{P}}=O$$

in which R' is an alkyl of 1 to 4 carbon atoms and R is a substituent selected from the group consisting of alkyls of 1 to 4 carbon atoms, phenyl and benzyl with phosphorus thiochloride.

6. A method of preparing polyphosphonic esters which comprises heating diethyl ethyl phosphonate with an inorganic halide selected from the group consisting of the halides and oxyhalides of sulfur and phosphorus.

7. A method of preparing polyphosphonic esters which comprises heating diethyl ethyl phosphonate with thionyl chloride.

8. A method of preparing polyphosphonic esters which comprises heating diethyl ethyl phosphonate with sulfuryl chloride.

9. A method of preparing polyphosphonic esters which comprises heating diethyl ethyl phosphonate with phosphorus oxychloride.

10. A polyphosphonate having the following formula:

$$\left(C_2H_5O-\underset{\underset{O}{\|}}{\overset{C_2H_5}{P}}-O-\right)_3 P=O$$

HUGH J. HAGEMEYER, Jr.
ALAN BELL.

REFERENCES CITED

The following references are of record in the file of this patent:

UNITED STATES PATENTS

| Number | Name | Date |
|---|---|---|
| 2,355,106 | Prutton | Aug. 8, 1944 |

OTHER REFERENCES

Kosolapoff: "Journal American Chemical Society," vol. 66 (1944), pages 1511–1512.